US012593120B2

(12) United States Patent (10) Patent No.: US 12,593,120 B2
Croll (45) Date of Patent: Mar. 31, 2026

(54) METHOD FOR ACQUIRING A PHOTOGRAPHIC PORTRAIT OF AN INDIVIDUAL AND APPARATUS IMPLEMENTING THIS METHOD

(71) Applicant: PHOTO-ME LIMITED, Epsom (GB)

(72) Inventor: Christian Croll, Claix (FR)

(73) Assignee: PHOTO-ME LIMITED, Epsom (GB)

( * ) Notice: Subject to any disclaimer, the term of this patent is extended or adjusted under 35 U.S.C. 154(b) by 277 days.

(21) Appl. No.: 18/020,204

(22) PCT Filed: Aug. 6, 2021

(86) PCT No.: PCT/EP2021/072042
§ 371 (c)(1),
(2) Date: Feb. 7, 2023

(87) PCT Pub. No.: WO2022/048861
PCT Pub. Date: Mar. 10, 2022

(65) Prior Publication Data
US 2023/0319390 A1 Oct. 5, 2023

(30) Foreign Application Priority Data
Sep. 3, 2020 (FR) ...................................... 2008937

(51) Int. Cl.
*H04N 23/60* (2023.01)
*G06V 10/14* (2022.01)
(Continued)

(52) U.S. Cl.
CPC ............. *H04N 23/60* (2023.01); *G06V 10/14* (2022.01); *G06V 10/98* (2022.01); *H04N 23/56* (2023.01)

(58) Field of Classification Search
CPC .............................................. G03B 2215/0567
See application file for complete search history.

(56) References Cited

U.S. PATENT DOCUMENTS 6,882,741 B2 * 4/2005 Dobashi ................... G07C 9/27
                                                    382/118
7,379,114 B2 * 5/2008 Adachi ................ G06V 40/166
                                                    348/222.1
(Continued)

FOREIGN PATENT DOCUMENTS

EP          2860582 A1     4/2015
WO    WO-2019168547 A1 *  9/2019 ............. G06V 10/10

OTHER PUBLICATIONS

Search Report and Written Opinion issued in International Patent Application No. PCT/EP2021/072042, dated Oct. 28, 2021.

*Primary Examiner* — Cynthia Segura
(74) *Attorney, Agent, or Firm* — MARSHALL, GERSTEIN & BORUN LLP

(57) ABSTRACT

This method for acquiring photographic portraits of an individual consists:
  in acquiring a biometric image of the face of the individual by means of at least one digital camera (22),
  concomitantly with this acquisition, illuminating said face of the individual with at least two separate light sources that are not centered on said face, said light sources consisting of light-emitting diodes (38) managed by a PWM system.
At least two acquisitions of said face are carried out, respectively:
  using a standard illumination, with a view to allowing the biometric acquisition of said face by said camera (22);
  using a differentiated illumination, that is, whereby said at least two light sources (36, 37) generate a lighting effect on said face, also acquired by said camera.
These two acquisitions are carried out non-simultaneously and randomly during a short length of time.
(Continued)

The central control and processing unit is adapted to process said acquisitions and to determine after processing of the acquisition using a differentiated illumination whether an artifact is present or absent.

21 Claims, 9 Drawing Sheets

(51) Int. Cl.

| | | |
|---|---|---|
| *G06V 10/98* | (2022.01) | |
| *H04N 23/56* | (2023.01) | |

(56) References Cited

U.S. PATENT DOCUMENTS

| | | | | |
|---|---|---|---|---|
| 2001/0031072 | A1* | 10/2001 | Dobashi | G06V 40/161 |
| | | | | 382/118 |
| 2003/0206645 | A1* | 11/2003 | Okazaki | G07C 9/37 |
| | | | | 382/173 |
| 2007/0002130 | A1* | 1/2007 | Hartkop | H04N 13/144 |
| | | | | 348/E7.078 |
| 2009/0009628 | A1* | 1/2009 | Janicek | H04N 7/144 |
| | | | | 348/333.01 |
| 2013/0176481 | A1* | 7/2013 | Holmes | H04N 23/62 |
| | | | | 348/370 |
| 2014/0230046 | A1 | 8/2014 | Dewan et al. | |
| 2014/0340577 | A1* | 11/2014 | Ocampo | G08B 13/19632 |
| | | | | 348/376 |
| 2015/0104162 | A1* | 4/2015 | Crasnianski | G03B 17/53 |
| | | | | 396/2 |
| 2018/0025244 | A1* | 1/2018 | Bohl | G06V 40/45 |
| | | | | 382/116 |
| 2021/0034893 | A1* | 2/2021 | Ebihara | G06V 40/168 |

* cited by examiner

METHOD FOR ACQUIRING A PHOTOGRAPHIC PORTRAIT OF AN INDIVIDUAL AND APPARATUS IMPLEMENTING THIS METHOD

DOMAIN OF THE INVENTION

The present invention concerns the technical field relative to the acquisition of photographs of individuals, particularly within booth-type appliances or devices.

The invention more particularly relates to the field of the securing of the acquisition of such photographs, in addition to the optimization of the quality thereof, particularly due to their destination for identity or access documents.

BACKGROUND

Installations of acquisition of photographs of the face of individuals are widely used. Typically, they have developed under trade name "Photomaton", particularly in France, and are conventionally formed of a booth delimited by lateral walls and further comprising an access to the inside of the booth conventionally closed by a curtain or the like. A device of acquisition of said photograph is integrated in one of the walls, this device being conventionally formed of a photographic device or camera, the individual's face being illuminated concomitantly with the acquisition of photograph.

One of the issues with which the designers of such installations are confronted lies in the optimization of the illumination of the face of the individual in question. More particularly, it is desired to avoid, as much as possible, "flattening" the rendering of said acquisition and to favor the distinction of the different raised areas of the face. The overexposure of certain parts of the face is also desired to be avoided.

Different solutions have been developed to do away with these disadvantages. In particular, document EP 2860582 describes an installation of the type in question, implementing two complementary light-emitting surfaces lateral with respect to the field of view of the photographic device or of the camera, and positioned between the wall integrating said acquisition member and the object focal plane of said acquisition device. This installation allows a homogeneous illumination of an individual's face, including when they pose in approximate fashion with respect to a reference position, resulting in the achieving of high quality photographic portraits, whatever the morphology and the positioning of the individual's face at the level of the reference position of said installation.

Undoubtedly, the installation described in this document enables to significantly improve the quality of the photographs thus obtained.

However, with the more specific purpose of taking such photographs for identity or security documents, governmental and/or security services desire to do away with any risk of spoofing, as currently designated under expression "anti spoofing". Indeed, such a spoofing, also known under denomination "biometric attack", may result, for example, from the placing of a mask in relief on the face of the individual in question, but also from the presentation, in the object focal place of the acquisition member, of a portrait on a planar or curved support representing a printing or an electronic display, thus likely either to generate usurpated photographs, or to allow the access to secure premises, thus deceiving the databases where authorized users are listed. This spoofing may also result from the digital association of at least two different faces, which results in being able to impersonate each of the identities which have been used for this association. This digital association is also known as "morphing".

The invention thus aims at overcoming this difficulty and at fighting these spoofing risks.

SUMMARY OF THE INVENTION

According to a first aspect, the method of acquisition of photographic portraits of an individual comprises:
- acquiring a biometric image of the individual's face by means of at least one digital camera,
- concomitantly with this acquisition, illuminating said individual's face with at least two separate light sources, not centered on said face, said light sources being formed of light-emitting diodes (Leds) managed by a PWM (acronym for "pulse width modulation") system;
- the PWM system and the operation of said at least one camera being managed by a central control and processing unit.

According to the invention, at least two acquisitions of said face are carried out, respectively:
- using a standard illumination, that is, whereby said at least two light sources are concomitantly activated so as to uniformly illuminate said face, to allow the biometric acquisition of said face by said at least one camera, that is, of the view subsequently used for example for identity papers or access control supports;
- using a differentiated illumination, that is, whereby said at least two light sources generate a lighting effect on said face, also acquired by said at least one camera;
- these at least two acquisitions being non-simultaneously and randomly carried out for a short length of time;
- the central control and processing unit being capable of processing said acquisitions and of determining after processing of the acquisition using a differentiated illumination whether an artifact is present or absent.

By artefact, there is meant in the sense of the invention the spoofing means targeted in the preamble of the present application, and generally any data which do not correspond to the real face of the individual having its photographic portrait desired to be acquired. Incidentally, the notion of artefact is described in standard ISO/IEC 30107-1 and -3.

Thus, the invention enables to fight any spoofing attempt, in simple and fast manner. Indeed, typically the total duration of acquisition lasts for less than one second, and the two acquisitions are undetectable by the individual in question or by an advanced electronic system implemented by said individual, and thus unpredictable, this all the more as said acquisitions occur randomly during this acquisition phase and in any order, that is, the acquisition under standard illumination may occur before or after the acquisition under differentiated illumination.

This notion of random character may express, in the context of the invention, in different ways.

Thus, as mentioned hereabove, it may result from the order of the acquisition sequences, respectively using a standard illumination and using a differentiated illumination, but also from the duration of pauses:
- between two successive acquisitions, typically close by a few tens of ms;
- and/or between the initialization of the acquisition process, that is, the starting of the cycle of acquisition of the portrait of the individual in question, and the effective starting of the sequence of acquisitions.

It may also result from the duration of acquisition of the face in question, respectively using a standard illumination and using a differentiated illumination, typically in the range from 1 ms to 30 ms.

This random character may also result from the variable frequencies of the PWM, directly reflecting on the activation of the LEDs forming part of the light sources.

These different means intended to provide the random character of the acquisitions may further be combined, to still further increase this random character and accordingly drastically limit any spoofing risk.

Further, and to deceive an individual attempting such a spoofing, the acquisition sequence may comprise the emission of light flashes by the light sources in a way decorrelated from the at least two acquisitions, that is, independently from the actual acquisitions. Thereby, the fraudulent analysis of the division of the cycle of said acquisitions becomes even more complex.

According to the invention, the two light sources are laterally positioned with respect to the field of view of said camera. As a variant, they may be positioned differently, and particularly be positioned above and under said field of view to illuminate the face in question from the top and from the bottom, or also according to diagonal orientations, the aim being to highlight the relief of said face by having shadows appear therewithin.

According to the invention, the differentiated illumination corresponds:

a lateralization by weighting of the illumination of the face;

to an aliasing effect achieved by the synchronization, and particularly by the coordination and the adaptation of the parameters of the camera and of the PWM system;

to a partial illumination by said at least two light sources in infrared, or even in a wavelength spectrum other than the visible spectrum; in this configuration, a second digital camera provided with a sensor having its sensitivity adapted to the considered wavelength or wavelength range is implemented;

to a variation of the light intensity generated by said at least two light sources;

or also, to a lateralization of the illumination of the face and 2D capture of said images with shadow variations according to the depth of the subject of the face, providing a depth effect and thus a 3D capture of the face (three-dimensional).

According to a first embodiment of the invention, the acquisition under a differentiated illumination of the individual's face is implemented by weighting of said illumination, and particularly by lateralization of said illumination. This lateralization is made possible due to the two above-mentioned light sources, the intensity of which can be modulated during said acquisition by means of the PWM system. In other words, the two portions of the individual's face located substantially on either side of a median plane running through the center between the two eyes and the bridge of the nose are illuminated according to a different intensity. The processing of the image thus acquired enables to discriminate all that is not three-dimensional, and for example a portrait printed on a planar or curved sheet, or also a picture appearing on an electronic display, such as a tablet or a smart phone. Indeed, due to the implementation of a lateralized illumination, a luminosity difference will appear at the level of the acquired image if effectively one is in presence of a three-dimensional object, due to the shadows resulting from the relief of said face. According to this embodiment, it is also possible to vary the above-mentioned random character by varying the variable ratio of the lateralization intensity, typically within a ratio from 1 to 5.

According to a second embodiment of the invention, the acquisition under a differentiated illumination of the individual's face results from the forming of an aliasing effect, detectable by the acquisition camera, and which will here again enable to discriminate screens of tablet or smart phone type. More precisely, the parameters of said camera, and particularly its scanning speed, are synchronized, and more particularly coordinated and adapted, with the PWM system, acting on the light sources, and thus one the illumination frequency of the Leds which form said light sources.

This aliasing effect distinctly appears in the presence of a real individual on the image acquired by the camera, and across the entire surface area in front of the illumination. However, this aliasing effect appears more attenuated on the background of the booth if the latter provides a sufficiently significant light power, in the configuration according to which the background of said booth is effectively provided with an illumination source (see hereafter). The background of the artifact (appearing on a printing or on an electronic display of tablet or smart phone type) and the background of the booth exhibit different patterns thus enabling to identify them.

According to a third embodiment of the invention, the acquisition under a differentiated illumination of the individual's face implements a partial illumination, for example, under infrared. For this purpose, at least one of the LEDs of at least one of the two light sources emits in infrared. This partial illumination under infrared enables to detect the present of a real face, and more particularly of the skin of said face. Indeed, the reflectivity rate of a support, and for example the skin, varies along with the wavelength, thus enabling to discriminate the skin.

According to a fourth embodiment of the invention, the acquisition under a differentiated illumination of the individual's face is based on a variation of the light intensity generated by said at least two light sources. Typically, if the light intensity of said sources is doubled, then this doubling appears on the subject's face. However, this doubling does not appear on an electronic display held up by said subject due to the light intensity generated by said display. The processing unit enables to detect the presence or the absence of this proportionality and accordingly to identify an artifact.

According to another embodiment of the invention, the acquisition under a differentiated illumination of the individual's face is implemented by simple lateralization of said illumination, de facto generating a shading effect on one of the portions of said face, typically defined by a vertical line running along the crest of the nose. This lateralization is made possible due to the two above-mentioned light sources, laterally positioned with respect to the field of view of the acquisition camera, and for example symmetrically with respect thereto.

This camera may be of standard 2D type, and is thus capable of acquiring the images along the depth axis by shading effect, and not in limiting fashion along a plane perpendicular to the optical axis of the camera. It is then proceeded by means of appropriate software to a pixel by pixel calculation of two images consecutively acquired by said camera, this for each of the primary colors (red, green, blue), and thus achieve a 3D mapping enabling to distinguish an artifact from a real face.

According to still another aspect of the invention, the installation of the type in question may comprise a background, facing the wall of the booth integrating the acquisition camera, said background being also provided with an illumination source managed by the central unit. In this configuration, the acquisition under a differentiated illumination of the individual's face implements the forming of an aliasing at the level of said background, by management of the frequency of illumination of the background and of the camera scanning frequency. Indeed, in such a configuration, the background illumination source is positioned behind the subject, so that the aliasing effect only appears on the background. Thus, if the subject holds up an electronic display, the captured background exhibits no aliasing. Thereby, the individual really present within the installation can be discriminated from screens of tablet or smartphone type.

Whatever the differentiated illumination mode implemented, possibly cumulated together, the image thus acquired by the camera is processed by the central management and processing unit, which by artificial intelligence will be capable of discriminating an individual really present in front of said camera from a 2D image or restitution, or even from the placing of a mask on the concerned individual's face.

In other words, the invention generally comprises modulating the illumination of the face of the individual having its portrait desired to be acquired, to fight risks of spoofing, particularly inherent to the wearing of a mask, to the exposure of a smart phone or tablet screen or of a printed sheet, or even also of "morphing".

According to a variant of the invention, it may be envisaged to add two additional captures or acquisitions, with identical illumination conditions. Thereby, and by means of an appropriate algorithm managed by the central control and processing unit, it is possible to determine the individual's stability all along the integration sequence, making any presentation of an artifact during said sequence impossible.

The invention also aims at an installation of acquisition of the photographic portrait of an individual implementing the previously-described method. This installation is formed of a booth delimiting an inner space, within which said individual is likely to position, and comprising:

a first wall delimiting a portion of the inner space of the booth, at least a portion of which is transparent;

at least one digital camera arranged behind a transparent or semi-transparent portion of said wall, and comprising a field of view directed towards the inside of the booth and having its object focal plane located in the inner space of the booth;

at least two illumination sources illuminating the inside of the booth, and arranged so that they laterally illuminate the individual's face, and being located outside of the field of view of the acquisition camera.

According to an embodiment, these illumination sources are formed of light-emitting diodes LEDs managed by PWM, and said at least one camera is of digital type, the management of the illumination of the light-emitting diodes and of the acquisition by the camera being managed by a central control unit also further ensuring the processing of the images acquired by said camera.

According to a variant of the invention, the previously-mentioned installation further comprises a background, opposite to said wall, integrating the acquisition camera, said background being provided with an illumination source, also managed by the PWM system.

According to a variant of the invention, this booth might be replaced with a stand, that is, a lighter structure.

According to still another variant of the invention, the entire process of acquisition of the individual's portrait is supervised, typically by a monitoring authority. In other words, when a secure enrolment is desired to be available, as may be required in a number of applications, an operator external to the installation must be able to monitor the different steps of said acquisition. For this purpose, the installation may comprise an additional camera, intended to remotely transmit in real time the content of the booth. As a variant, at least one of the walls delimiting the inner space of the booth may be provided with variable light-blocking properties.

BRIEF DESCRIPTION OF THE DRAWINGS

The way in which the invention may be implemented and the resulting advantages will better appear from the following non-limiting embodiments, in relation with the accompanying drawings.

DETAILED DESCRIPTION OF THE INVENTION

Figure 1:
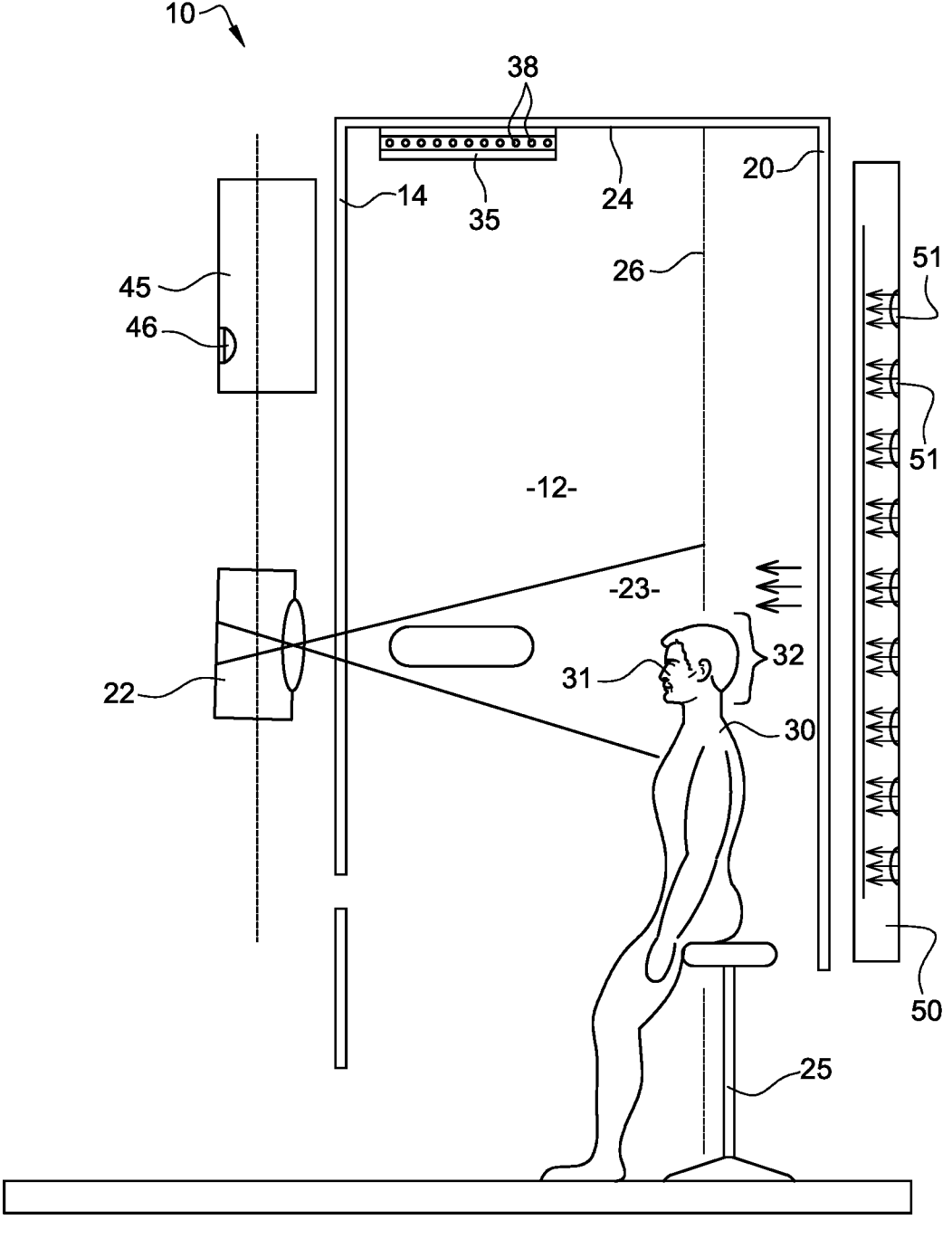
FIG. 1 is a simplified representation in cross-section of an embodiment of an installation of acquisition of photographic portraits according to the invention.

FIG. 1 illustrates an example of embodiment of a photographic portrait acquisition installation 10 according to the invention. It comprises a booth 12 delimited by four walls 14, 16, 18, and 20, in addition to a ceiling 24; one of said walls being only partial, to allow the introduction of an individual into the general volume defined by said walls.

A first wall 14 comprises at least a transparent portion, to enable a digital camera 22 positioned behind said wall to have its field of view 23 and its object focal plane 26 inside of the booth.

A seat 25 may be present in the booth to enable a user 30 to sit in front and close to the object focal plane 26 of the digital camera 22. More precisely, the seat is placed to comprise the object focal plane of said camera. An adjustment device enables the user to adjust the position of the seat or of the camera to place his/her face 31 in a reference position 32. The reference position is centered in the plane defined by the intersection of field of view 23 and the object focal plane 26 of digital camera 22.

Installation 10 comprises means enabling the user to position his/her face in the reference position, whether he/she is standing up, or sitting on seat 25, if present. These means may be visual indications located on wall 14 in front of digital camera 22, such as for example a mark to position his/her eyes at the right height in the field of view of said camera.

The installation comprises a light emission source 35 positioned between the object focal plane 26 of digital camera 22 and the first wall 14 of the booth. According to the present example, it is attached to the ceiling 24 of the booth by appropriate means, and embedded therein.

Figure 2:
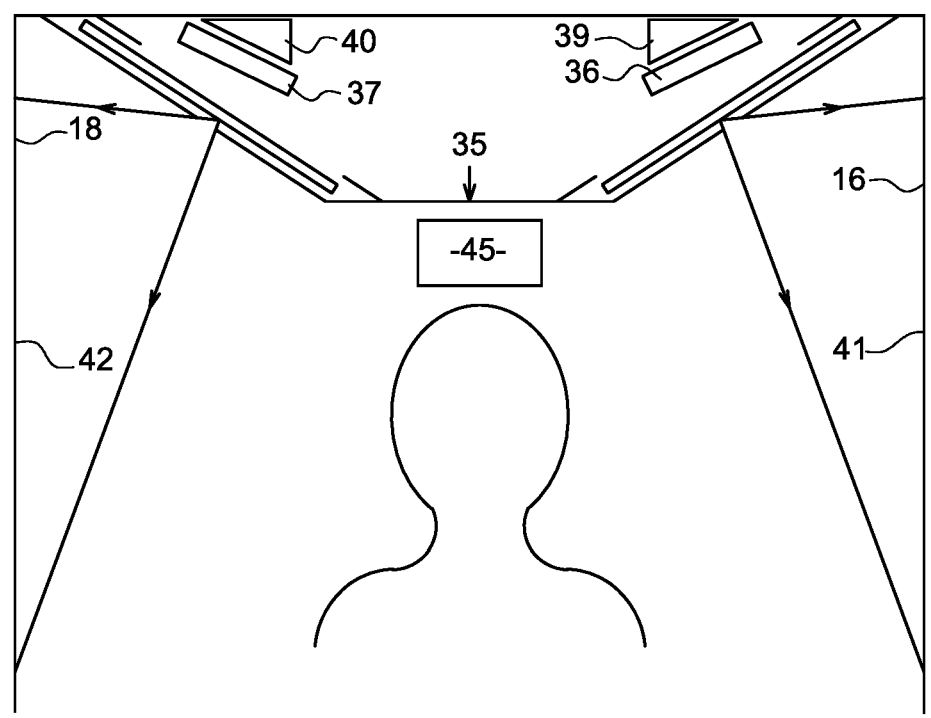
FIG. 2 is a simplified representation of a front view of one of the walls of the installation of FIG. 1.

As illustrated in FIG. 2, light emission source 35 comprises a first and a second lighting element, that is, it actually defines two light sources. More precisely, a first lighting element 36 is arranged to illuminate second wall 16 delimiting the booth and adjacent to said first wall 14, and a second lighting element 37 is positioned to illuminate third wall 18 of said booth, facing second wall 16. The second and third walls are thus positioned opposite each other, and secant to first wall 14, orthogonally or to define therewith an obtuse angle. In this last configuration, the cross-section of the booth is no longer rectangular, but trapezoidal.

Figure 3:
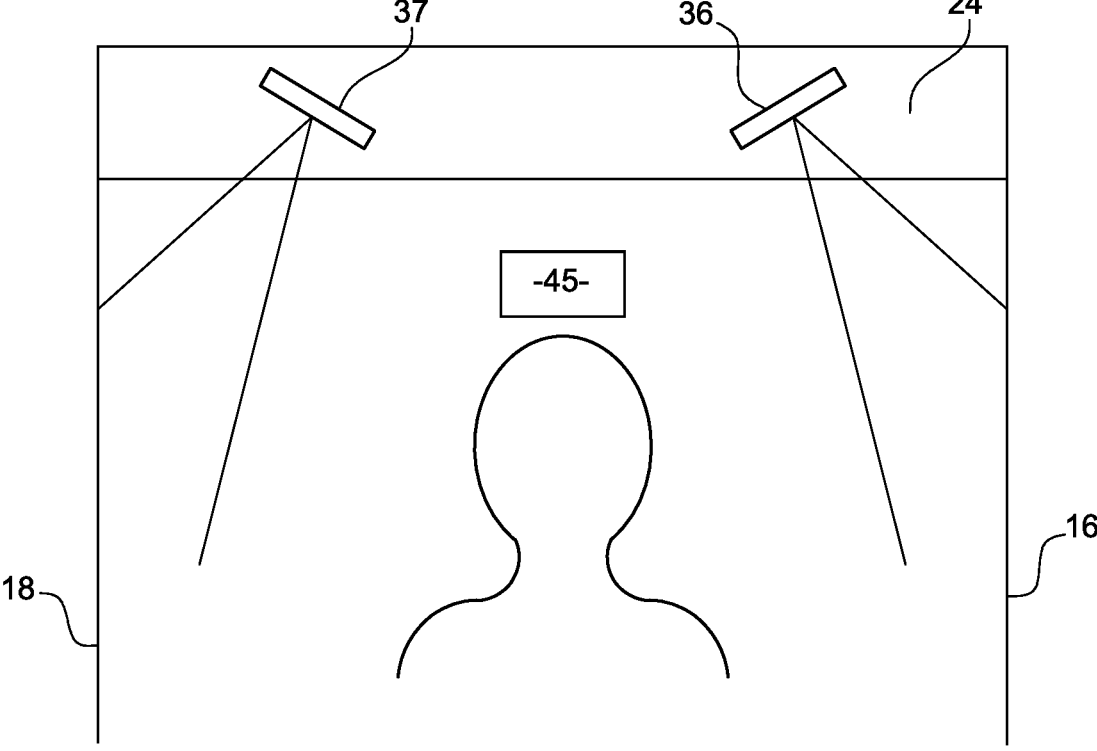
FIG. 3 is a simplified view similar to FIG. 2, of an alternative embodiment of the illumination.

According to the embodiment illustrated in FIGS. 1 to 3, the first and the second lighting elements are each formed of an alignment of LEDs 38 maintained and oriented in front of the lateral walls 16, 18 of the booth, for example, via respectively a first shim 39 and a second shim 40. Any other device could however be envisaged. In other words, the longitudinal arrangements of the LEDS are substantially parallel to the second wall 16 and/or to the third wall 18. The LEDs emit light of warm white color with a color rendering index equal to 85, a temperature of approximately 4,000 Kelvins, an intensity of at least 550 Lumens (per lighting element), and a diffusion angle between 30° and 40°. These different LEDs are powered with appropriate current sources, and their power supplies are periodically switched by a PWM system, for which there are defined according to the desired effect a pulse frequency from a plurality of hertz to a plurality of kilo hertz and a duty cycle variable from 0 to 100%. This PWM system is itself managed via a USB interface by a central control and processing unit (not shown) via an electronic interface board.

More particularly, according to a preferred embodiment of the invention, the angles of shims 39 and 40 are selected so that lighting elements 36, 37 illuminate areas of the second 16 and third 18 walls located at the same height in the booth as the surface delimited by the intersection between the field of view 23 and the object focal plane 26 of digital camera 22. The inclination generated by the shims may not be identical for each of lighting elements 36, 37, the optimization of these angles typically depending on the distance between the user (reference position 32) and walls 16 and 18, as well as on the distance between the user and the height of light source 35, and on the distance between the axes of the two lighting elements 36 and 37.

Thus, the light emitted by light-emitting source 35 is reflected on areas 41, 42 of walls 16, 18, then forming a first diffusing light-emitting surface on second wall 16, and a second diffusing light-emitting surface on second wall 18 positioned in front and on the sides of the user's face 31. The light thus generated also reflects on first wall 14, these different walls being coated with appropriate means capable of reflecting light.

Advantageously, light-emitting surfaces 41, 42 and 14 illuminate all the portions of the face of user 30, according to a large number of incident directions. Thereby, the face is homogeneously illuminated.

Due to the presence of these two lighting elements, to their location, and to their operating mode, and particularly to the reflection of the light that they emit on diffusing surfaces 41, 42, and 14, in addition to their technical features (light intensity), the installation of the invention can do away with any facial light source, provided for the inner surface of wall 14 to be coated with a reflective layer. Thus, part of the light emitted by light sources 36, 37 reflects on this wall 14, and is used as a facial (or front) illumination of the user's face.

However, such a facial light source may be implemented. It has been shown with reference 45 in FIGS. 1 to 3. This facial light source may be formed of a LED 46, emitting a light of warm white color characterized by a color rendering index greater than 85, a temperature of approximately 4,000 Kelvins, a native intensity greater than 550 Lumens, and a diffusion angle of 120°.

Indeed, due to the presence of two lateral light sources 36, 37, one can either decrease the intensity of the light emitted by facial light source 45 when it is present, or overcome its absence by varying the intensity of the illumination of said lateral light sources 36, 37. The dazzling of the user by facial light source 45 is then less significant, or even absent, thus providing a better comfort of use of the installation by the user.

According to the invention, a fourth wall 20 closes the booth and forms the background, opposite to first wall 14. This fourth wall 20 may be at least partially transparent, to enable another emission device 50 arranged behind said wall to illuminate the inside of the booth. This emission device 50 may comprise an array network of LEDs 51 of different colors, for example, blue, red, and green, enabling to illuminate the background of the booth according to a plurality of colors. The LEDs may be similar to those described hereabove. This array of LEDs 51 is also managed by the previously-mentioned PWM system.

A surface of the fourth wall 20 may also be covered with an antireflection (or mat) and dark layer, for example black, and semi-transparent. This surface of the fourth wall can then absorb part of the light originating from the inside of the booth, to allow an optimal color saturation and homogeneity of the background of the booth by the fourth emission device.

Further, at least one of the two lateral walls 16, 18 of the booth necessarily has to allow the introduction of the user into the volume that it defines. For this purpose, either one of the two walls 16, 18 slides, or it is replaced with a curtain or any light-blocking support. In this last case, and to take into account the difference of nature between such a curtain and the lateral wall which faces it, and to have an adapted illumination, light sources 36, 37 are varied by particularly having their intensity differentiated, via the PWM system.

Further, in the context of the implementation of such a booth for secure enrolment, implying the supervision of the process of acquisition of the concerned user's face by a third party, and for example by an operator assigned for this purpose, lateral walls 16, 18 as well as background wall 20 may be provided with variable light-blocking properties.

Typically, all or part of said walls may be made of a transparent material, and for example glass, and be coated with a liquid crystal film. Such a film has electro-optical properties such that it switches from a light-blocking state to a transparent state under the application of an electric field. In the case in point, the electric pulse controlling the transition between a light-blocking state and a transparent state is synchronized with the at least two acquisitions of the face by the central control and processing unit to ensure the desired illumination. The actual acquisition phases are carried out under the light-blocking state.

It should be understood that such a film may be replaced with any system ensuring the same function, and for example of Venetian or Californian blind type, having its orientation controlled by an electric motor, also as ordered by the control and processing unit.

According to a variant of the previous embodiment, and still with the purpose of having a secure enrolment, there is positioned within the booth, and for example on the ceiling, a monitoring camera, filming in real time the inside of said booth, enabling an operator or a monitoring authority to remotely control the operations.

The method of acquisition of biometric photographic portraits of an individual by means of the previously-described installation will now be described.

According to an essential feature of the invention, once the concerned individual is in place in the booth, at least two acquisitions of said individual's face are carried out, respectively:

an acquisition carried out under a standard illumination, that is, whereby the two light sources 36, 37 are simultaneously activated to uniformly illuminate the face, with a view to allowing the biometric acquisition of said face by digital camera 22, that is, of the view subsequently used for example for identity papers or access control supports;

and an acquisition carried out under a differentiated illumination, that is, whereby the two light sources 36, 37 generate a lighting effect on said face, also acquired by digital camera 22.

These two acquisitions are not carried out simultaneously, but however, they are randomly carried out for a short length of time, typically shorter than 1 second, and preferably shorter than 300 milliseconds.

These at least two acquisitions are processed by the control and processing unit integrated within the booth, and which is capable of determining, after processing of the acquisition carried out according to a differentiated illumination, whether an artifact is present or absent.

The different differentiated illumination modes will now be described.

Figure 4:
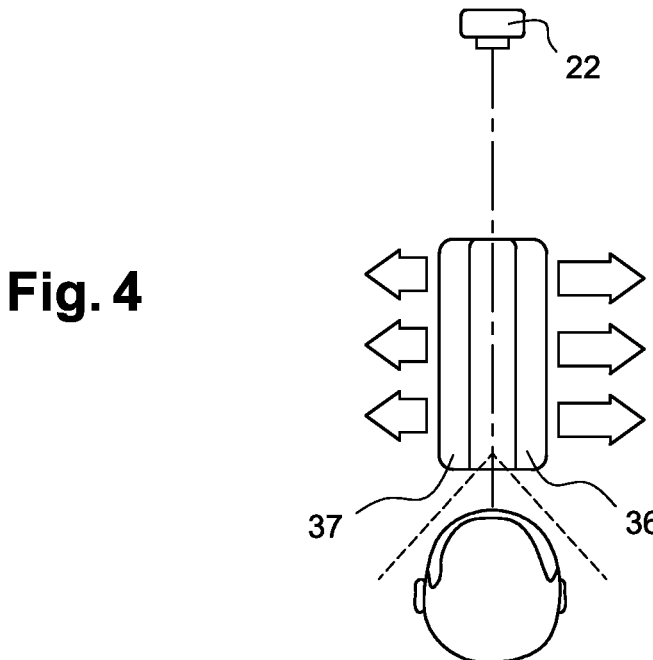
FIG. 4 is a simplified top view illustrating a first differentiated illumination mode, in the case in point by lateralization of the illumination.
Figure 5:
FIG. 5 schematically illustrates the acquired image of a face after the lateralization of the illumination.
Figure 5:
Figure 6:
FIG. 6 illustrates the image of FIG. 5 in normal illumination.

According to a first mode of the invention, illustrated in relation with FIGS. 4 to 6, this differentiated illumination is formed by the weighting of said illumination, and more precisely by a lateralization of said illumination. This lateralization is made possible due to the two light sources 36, 37, the intensity of which can be modulated during said acquisition by means of the PWM system. In other words, the two portions of the individual's face located substantially on either side of a median plane running through the center between the two eyes and the bridge of the nose are illuminated according to a different intensity, as illustrated in FIG. 4 by arrows of unequal lengths starting in the case in point from light source 37.

The image illustrated in FIG. 5, which effectively shows an illumination difference between the left-hand side and the right-hand side of the face, is thus obtained. On this regard, it is possible to vary, still by means of the PWM system, the intensity difference between the two light sources 36, 37.

The processing of the image thus acquired enables to discriminate all that is not three-dimensional, and for example a portrait printed on a planar or curved sheet, or also a picture appearing on an electronic display, such as a tablet or a smart phone. Indeed, due to the implementation of a lateralized illumination, a luminosity difference will appear at the level of the acquired image (FIG. 5) if effectively one is in presence of a three-dimensional object, due to the shadows resulting from the relief of said face.

Typically, by means of an appropriate algorithm, the central processing unit is capable of dissociating on the one hand the image of the texture of the face (which could for example be present on a printed photograph) and on the other hand the depth image of the face. Thus, an analysis by artificial intelligence by means of an appropriate algorithm of this depth image of the face enables to detect the presentation in front of camera 22 of a planar or curved support, of printed sheet or tablet or smart phone screen type.

Figure 7:
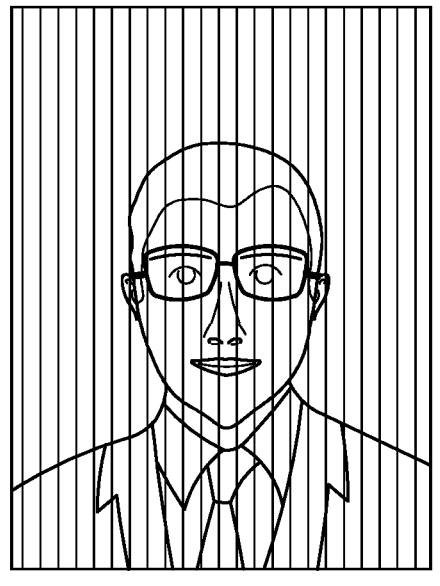
FIG. 7 is a simplified view of the acquired image of a face under aliasing according to a second differentiated illumination mode.
Figure 8:
FIG. 8 is a simplified view of the acquisition of a smart phone screen acquired under aliasing, to be compared with the view of FIG. 7.

According to a second mode of the invention, illustrated in relation with FIGS. 7 and 8, this differentiated illumination is achieved by the forming of an aliasing effect detectable by digital camera 22.

In the case in point, the parameters of digital camera 22, and particularly its scanning speed, are synchronized, and more precisely coordinated, with the PWM system, acting on light sources 36, 37, and thus on the illumination frequency of the LEDs 38 which form them. For this purpose, camera 22 implements a CMOS sensor of a type better known as "rolling shutter", and such as for example illustrated on Internet link https://en.wikipedia.org/wiki/Rolling shutter.

This aliasing effect appears as stripes on the acquired image, appearing on the individual's face (FIG. 7) and on the background. The width of these stripes depends on the one hand on the pulse period of LEDs 38, knowing that this period is linked to the frequency of the PWM system and to the duty cycle of the PWM (that is, the intensity variation of LEDs 38), and on the other hand on the duration of reading of the lines of digital camera 22. The properties of these stripes may vary over certain areas of the image in intensity and in width. These areas particularly concern the light-emitting surfaces, likely to be in front of camera 22. Thus, typically, an electronic display of smart phone or tablet type, or even an illuminated surface, such as surface 20, when the latter is provided with a light source 50, affect the image captured by said camera. It can thus be observed in FIG. 8 that the area limited to the smart phone screen, that is, the light-emitting area, exhibits no aliasing. Thereby, the central processing unit is capable of differentiating the presence of a real individual or of an artifact resulting from the presentation in front of camera 22 of such a screen, and generally of a light source.

Figure 9:
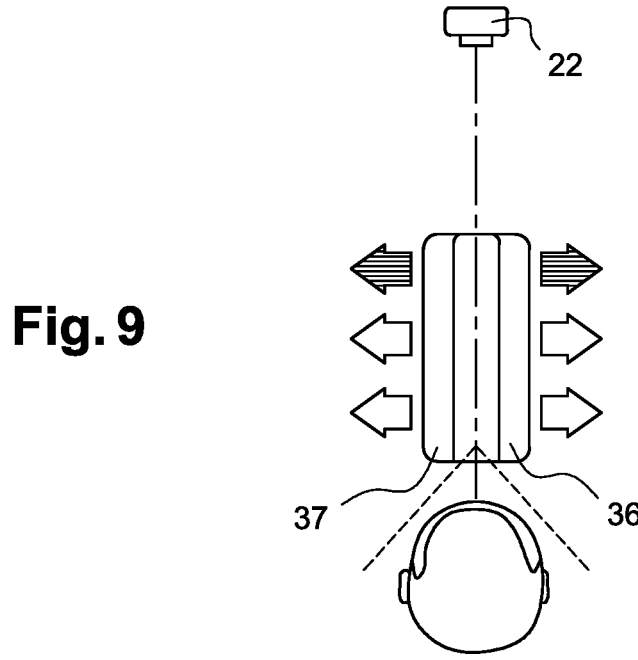
FIG. 9 is a simplified top view, similar to FIG. 4, illustrating another differentiated illumination mode, in the case in point by partial illumination under infrared.

According to a third embodiment of the invention, illustrated in relation with FIG. 9, this differentiated illumination is formed by the partial illumination of the individual's face under a wavelength spectrum other than visible, and for example under infrared. For this purpose, at least one of the LEDs 38 of at least one, or even the two light sources 36, 37 emits in infrared (the two top arrows in FIG. 8).

This partial illumination under infrared enables to detect the presence of a real face, and more particularly of the skin of said face. Indeed, the reflectivity rate of a support, and for example the skin, varies along with the wavelength, thus enabling to discriminate the skin with respect to a more neutral support, such as a paper sheet or a screen of smart phone or tablet type by artificial intelligence at the level of the processing unit. Thus, typically, the reflectance of a photographic paper, likely to represent a face for spoofing purposes, is more significant than that of a real face.

According to a fourth mode of the invention, not shown, this differentiated illumination is achieved by a variation of the light intensity generated by the two light sources 36, 37. Typically, if the light intensity of said light sources is doubled, then this doubling appears on the subject's face and is detected by the central processing unit. However, this intensity doubling does not appear on an electronic display of smart phone or tablet type held up by said subject due to the light intensity generated by said display. The processing unit enables to detect the presence or the absence of this proportionality and accordingly to identify an artifact.

According to a fifth mode of the invention illustrated in relation with FIGS. 10 to 13, the differentiated illumination is achieved by the forming of an aliasing at the level of the background 20 of the booth, when the latter is provided with an illumination source 50, of the type of that previously discussed.

Figure 10:
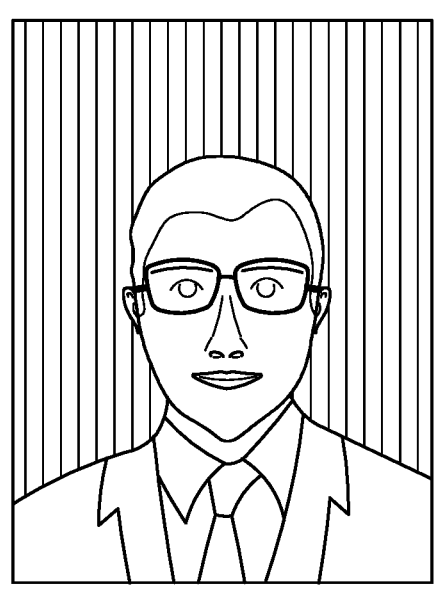
FIG. 10 schematically illustrates the acquired image of a face under aliasing of the background of the booth according to another differentiated illumination mode.
Figure 11:
FIG. 11 is a view similar to FIG. 10, illustrating a variation of the parameters generating the aliasing.
Figure 12:
FIG. 12 is a simplified view of the acquisition of a smartphone screen in the same conditions as those of FIG. 10.
Figure 13:
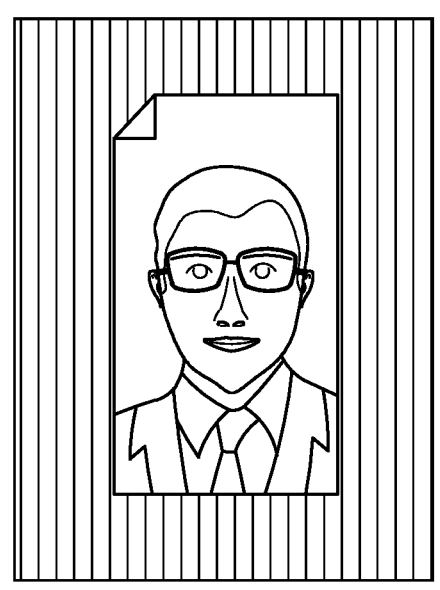
FIG. 13 is a simplified view of the acquisition of a printed sheet in the same conditions as those of FIG. 10.

Thus, this time by varying the scanning frequency of digital camera 22, here again of "rolling shutter" type, and the illumination frequency of the LEDs 51 of the light source 50 of background 20, the effect of the aliasing can only be observed on the acquired image on the background of said image (FIGS. 10 and 11). Thus, if the subject holds up a printed paper sheet (FIG. 13) or an electronic display (FIG. 12), the background locally captured around the subject exhibits no aliasing. Thus, in FIGS. 12 and 13, it can be observed that the area present behind the face appearing on the screen or on the paper sheet is deprived of any aliasing. Thereby, the central processing unit is capable of discriminating the individual really present within the installation from a screen of tablet or smart phone type.

According to the invention, these different differentiated illumination modes may be implemented alone or in combination. Such a combination optimizes the capacity of the central processing unit of discriminating artifacts, and thus accordingly, of more efficiently still fighting any spoofing attempt.

The combined implementation of the second and fifth previously-described embodiments, that is, the two described aliasing modes, has for example been described in relation with FIGS. 14 to 17.

Figure 14:
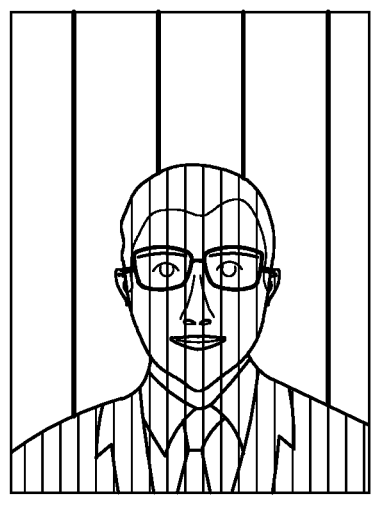
FIG. 14 is a simplified view illustrating the acquired image of a face under aliasing of the background of the booth and of the lateral illumination, that is, mixing two of the previously-illustrated differentiated illumination modes.
Figure 14:

Thus, in FIG. 14, a double aliasing can be observed, that is, with different beat widths between the individual and the rest of the acquisition.

Figure 15:
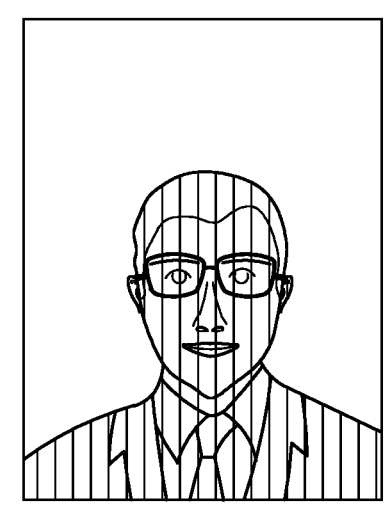
FIG. 15 is a simplified view illustrating the acquired image of a face implementing the previous mode, with a saturation of the camera by the background illumination.
Figure 16:
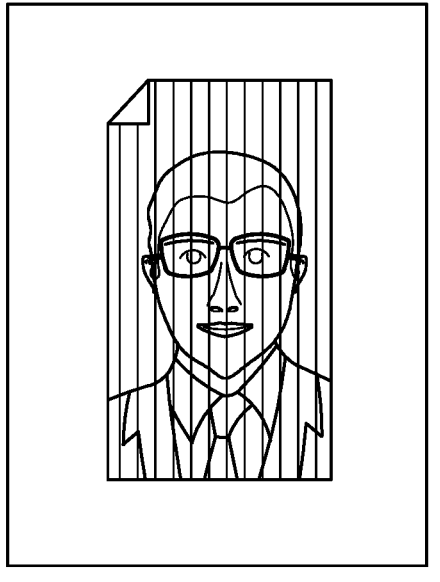
FIG. 16 is a simplified view similar to FIG. 15, illustrating the acquired image of a printed sheet in the same conditions.
Figure 17:
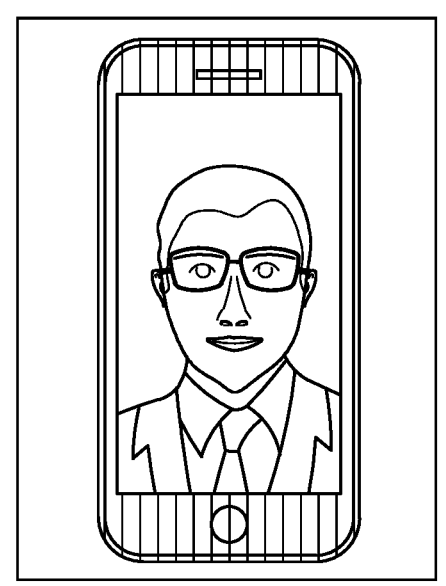
FIG. 17 is a view similar to FIG. 16, illustrating the acquired image of a smart phone, here again in the same conditions as those of FIG. 15.

In FIG. 15, the intensity of the light source 50 of background wall 20 is varied to saturate digital camera 22. Thereby, an aliasing can only be observed on the individual in FIG. 15, the rest of the acquired image being white. In this same configuration, that is, with a saturation of digital camera 22 by the intensity of light source 50, there can be observed in FIG. 16 illustrating the acquisition of a printed paper sheet, that the entire sheet appears with the aliasing, including the areas of said sheet external to the printed portrait. Similarly, and in the same configuration, it can be observed in FIG. 17 that the smart phone is only covered with aliasing on the periphery of the actual screen, said screen being as such also likely to generate the saturation of digital camera 22.

With this combination of differentiated illumination modes, the discrimination performed by the central processing unit, and thus accordingly the anti-spoofing, is thus optimized.

Figure 18:
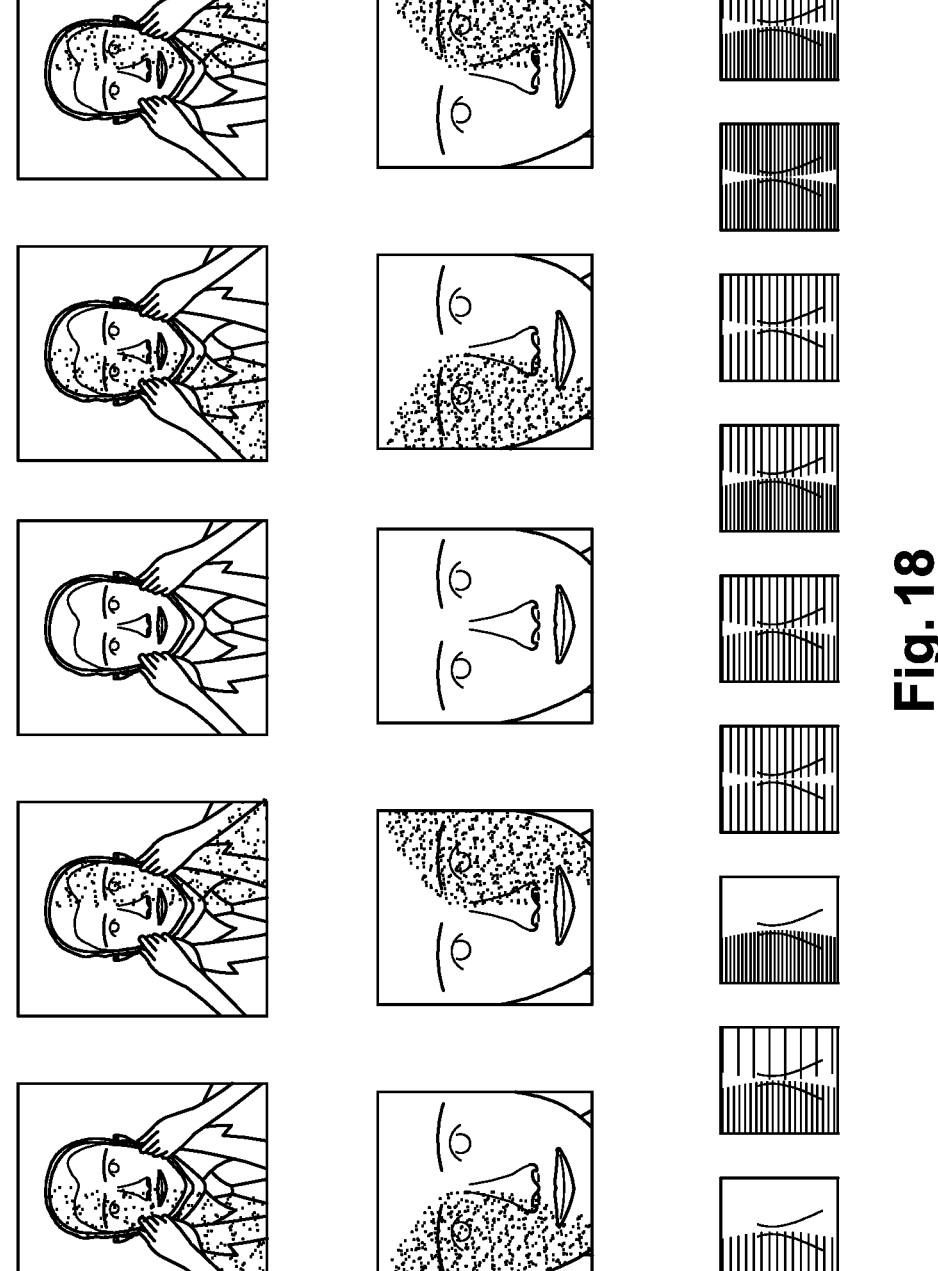
FIG. 18 is a simplified view illustrating the acquisition in depth mode of a user's face printed on a curved sheet and its translation by a 3D mapping.
Figure 19:
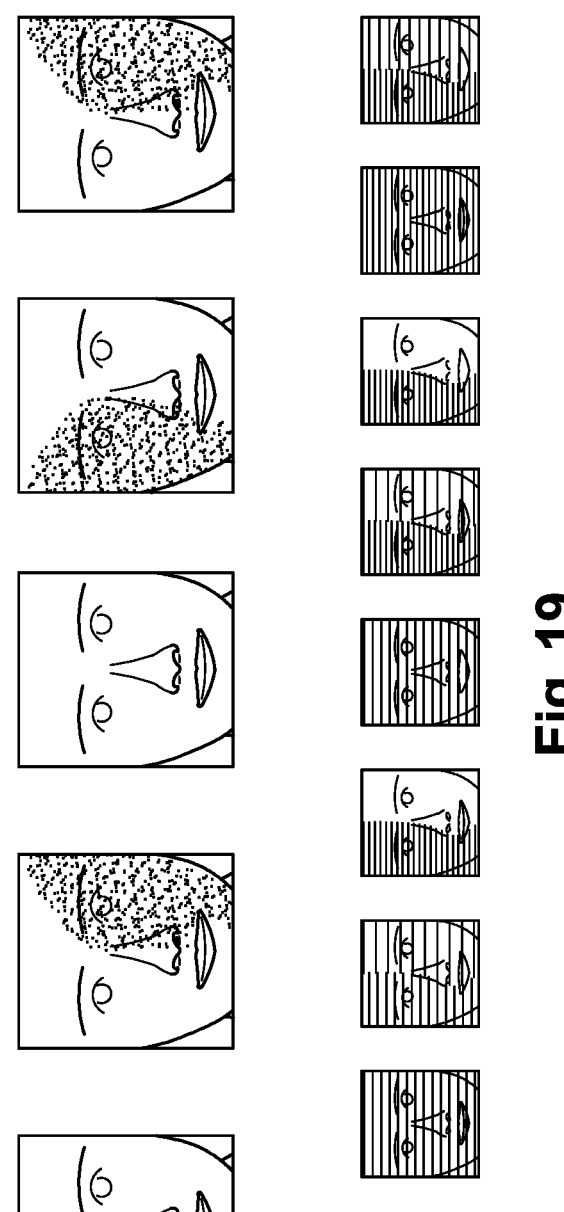
FIG. 19 is a view similar to FIG. 18 of the acquisition in depth mode of a user's real face.

There has been shown in FIGS. 18 and 19 another mode of the invention, based on the principle of a lateralization of the illumination of the user's face, in the context of the differentiated illumination.

In these drawings, the first line corresponds to the raw acquisition under differentiated illumination, the second line corresponds to extracts of the acquisitions of the face, and the third line is an extraction of the depth map for different color planes.

Thus, in FIG. 18, there is a fraud attempt by exposure in front of the camera, typically a 2D camera, of a printed paper sheet showing a face, and cylindrically curved (first row). The second row schematically illustrates the images acquired by the camera, by varying the illumination emitted by the lateral light sources, thus supposed to create a shadow area with respect to an artificial line running through the center located between the two eyes and the bridge of the nose. This images capture is then processed by means of an algorithm for determining the illumination difference pixel by pixel of each of said acquisitions. This processing results in the result illustrated in the third row, where, due to the use of a curved printed paper sheet, the system detects the spoofing attempt.

This FIG. 18 is to be compared with FIG. 19, where a real user is positioned in front of the camera. The algorithmic processing of the image capture enables to show (third row) that a real individual is present, and accordingly to avoid the spoofing risk.

The previous different differentiated illumination modes may further be coupled with the reinforcement of the random character of the acquisitions, such as specified in the context of the above presentation of the invention.

One can understand the advantage of the present invention in anti-spoofing, which is a highly critical subject for security services, be they governmental or private.

The invention claimed is:

1. A method for acquiring photographic portraits of an individual within a closed volume, comprising:
    acquiring a biometric image of the individual's face by means of at least one digital camera,
    concomitantly with this acquisition, illuminating said individual's face with at least two separate light sources, not centered on said face, said light sources being formed of light-emitting diodes (LEDs) managed by a pulse width modulation (PWM) system;
    the PWM system and the operation of the digital camera being managed by a central control and processing unit;
    in which method at least two acquisitions of said face are carried out, respectively:

using a standard illumination, that is, whereby said at least two light sources are concomitantly activated so as to uniformly illuminate said face, with a view to allowing the biometric acquisition of said face by said at least one camera;

using a differentiated illumination, that is whereby said at least two light sources generate a lighting effect on said face, also acquired by said at least one camera;

these at least two acquisitions being non-simultaneously and randomly carried out for a length of time shorter than 1 second;

the central control and processing unit being capable of processing said acquisitions and of determining after processing of the acquisition using a differentiated illumination whether an artifact is present or absent.

2. The method for acquiring photographic portraits of an individual according to claim 1, wherein the two light sources are positioned either laterally with respect to the field of view of the camera, or above and under said field of view, or also positioned so as to illuminate the face in question according to diagonal orientations, so as to highlight the relief of said face by having shadows appear therewithin.

3. The method for acquiring photographic portraits of an individual according to claim 1, wherein the differentiated illumination results, alone or in combination:

from a lateralization by weighting of the illumination of the face;

from an aliasing effect achieved by the synchronization, and particularly by the coordination and the adaptation of the parameters of the digital camera and of the PWM system;

from a partial illumination by at least one of said at least two light sources in a wavelength spectrum other than the visible spectrum, and particularly in infrared;

from a variation of the light intensity generated by said at least two light sources;

or from a lateralization of the illumination of the face due to the implementation of two light sources.

4. The method for acquiring photographic portraits of an individual according to claim 3, wherein the acquisition under a differentiated illumination of the individual's face is implemented by weighting of said illumination, and particularly by lateralization of said illumination, resulting from the management of the two light sources by means of the PWM system, and generating at the level of said face, an illumination of different intensity on the two portions of the individual's face located substantially on either side of a median plane running through the center located between the two eyes and the bridge of the nose.

5. The method for acquiring photographic portraits of an individual according to claim 3, wherein the acquisition under a differentiated illumination of the individual's face results from the forming of an aliasing effect, detectable by the digital acquisition camera, the forming of this aliasing effect resulting from the synchronization of the parameters, and particularly from the coordination and the adaptation of the operating parameters of said camera, with the PWM system acting on the light sources, and thus on the illumination frequency of the LEDs which form them.

6. The method for acquiring photographic portraits of an individual according to claim 3, wherein the acquisition under a differentiated illumination of the individual's face implements a partial illumination under infrared, one at least of the LEDs forming part of each of the two light sources emitting in infrared.

7. The method for acquiring photographic portraits of an individual according to claim 3, wherein the acquisition under a differentiated illumination of the individual's face is based on a variation of the light intensity generated by said at least two light sources.

8. The method for acquiring photographic portraits of an individual according to claim 3, wherein said acquisition under a differentiated illumination of the individual's face is implemented by lateralization of said illumination, resulting from the management of the two light sources by means of the PWM system, and generating at the level of said face a shadow area located on one side or the other of a median plane running through the center located between the two eyes and the bridge of the nose, the images acquired after this lateralization being captured by a 2D camera, and is thus capable of acquiring the images along the depth axis by shading effect, said images then being algorithmically processed pixel by pixel to generate a 3D mapping enabling to distinguish an artifact from a real face.

9. The method for acquiring photographic portraits of an individual according to claim 1, wherein the installation further comprises an additional illumination source also formed of LEDs and facing the digital acquisition camera and positioned beyond the object focal plane of said camera, this additional illumination source being also managed by the central management and processing unit, and wherein the acquisition under a differentiated illumination of the individual's face results from the forming of an aliasing at the level of the background of the image acquired by the digital camera, the forming of this aliasing effect resulting from the synchronization, and particularly from the coordination and the adaptation of the parameters of said camera with the PWM system acting on the LEDs of said additional light source, and thus on the illumination frequency of the LEDs which form said additional light source.

10. The method for acquiring photographic portraits of an individual according to claim 1, wherein the randomness of the acquisitions, respectively using a standard illumination and using a differentiated illumination, is linked to the order of said acquisitions.

11. The method for acquiring photographic portraits of an individual according to claim 1, wherein the randomness of the acquisitions, respectively using a standard illumination and using a differentiated illumination, is linked to the duration of the pauses, respectively:

between two consecutive acquisitions, the duration of said pauses being close by a few tens of ms;

and/or between the initialization of the acquisition process, that is, the starting of the cycle of acquisition of the portrait of the individual in question, and the effective starting of the sequence of acquisitions.

12. The method for acquiring photographic portraits of an individual according to claim 1, wherein the randomness of the acquisitions, respectively using a standard illumination and using a differentiated illumination, is linked to the duration of acquisition of the face in question, respectively using a standard illumination and using a differentiated illumination in the range from 1 ms to 30 ms.

13. The method for acquiring photographic portraits of an individual according to claim 1, wherein the randomness of the acquisitions, respectively using a standard illumination and using a differentiated illumination, is linked to the variable frequencies of the PWM, directly reflecting on the activation of the LEDs forming part of the light sources.

14. The method for acquiring photographic portraits of an individual according to claim 1, wherein the randomness of the acquisitions, respectively using a standard illumination and using a differentiated illumination, is linked to the emission of light flashes by the light sources in a way decorrelated from the at least two acquisitions.

15. An installation for acquiring the photographic portrait of an individual, formed of a booth delimiting an inner space, within which said individual is to position, and comprising:

a first wall delimiting a portion of the inner space of the booth, at least a portion of which is transparent;

a camera arranged behind said transparent portion of said wall and comprising a field of view directed towards the inside of the booth and having its object focal plane located in the booth;

at least two illumination light sources illuminating the inside of the booth, and arranged so that they laterally illuminate the individual's face, and being located outside of the field of view of the acquisition camera, wherein the illumination sources are formed of light-emitting diodes LEDs managed by a pulse width modulation (PWM) system, in that the acquisition camera is of digital type, wherein the management of the lighting of the light-emitting diodes and of the acquisition by the camera is managed by a central control unit also further ensuring the processing of the images acquired by said camera, said two illumination light sources being simultaneously activated with a view to allowing a biometric acquisition of said individual's face by said digital camera, and said two illumination light sources generating a differentiated illumination with a view of acquiring another image of said individual's face by said digital camera, said acquisitions being not carried out simultaneously but randomly carried out for a length of time shorter than 1 second.

16. The installation for acquiring the photographic portrait of an individual according to claim 15, wherein the illumination light sources are formed of two linear arrays of LEDs positioned at the level of the ceiling of the installation between said first wall and the object focal plane of the digital camera, and wherein said light sources illuminate the lateral walls of the installation, secant with said first wall.

17. The installation for acquiring the photographic portrait of an individual according to claim 16, wherein the at least one of said lateral walls is formed by a retractable curtain shutter or a light-blocking support.

18. The installation for acquiring the photographic portrait of an individual according to claim 15, further comprising a background wall, opposite to said first wall integrating the acquisition camera and positioned beyond the object focal plane of said camera, said background wall being provided with an additional illumination light source, formed of LEDs and managed by the PWM system also ensuring the management of the light sources.

19. The installation for acquiring the photographic portrait of an individual according to claim 15, wherein at least one of the walls is transparent, and is provided with variable light-blocking properties, the state change between the transparent state and the light-blocking state being managed by the central control unit.

20. The installation for acquiring the photographic portrait of an individual according to claim 19, wherein at least one wall is coated with a liquid crystal film, which switches from a light-blocking state to a transparent state under the application of an electric pulse synchronized by the central control unit.

21. The installation for acquiring the photographic portrait of an individual according to claim 15, wherein the booth integrates an additional camera intended to remotely transmit in real time the content of said booth.

* * * * *